United States Patent [19]

Ota et al.

[11] 4,234,835
[45] Nov. 18, 1980

[54] SPEED CONTROL APPARATUS FOR DC MOTOR

[75] Inventors: Mitsuharu Ota, Takatsuki; Isao Yoshida, Neyagawa; Hiromitsu Nakano, Katano, all of Japan

[73] Assignee: Matsushita Electric Industrial Co., Ltd., Kadoma, Japan

[21] Appl. No.: 957,577

[22] Filed: Nov. 3, 1978

[30] Foreign Application Priority Data

Nov. 14, 1977 [JP] Japan .................................. 52-136893

[51] Int. Cl.³ .............................................. H02P 5/16
[52] U.S. Cl. .................................... 318/317; 318/331
[58] Field of Search ....................... 318/341, 317, 331; 307/297; 323/22 T

[56] References Cited

U.S. PATENT DOCUMENTS

| | | | |
|---|---|---|---|
| 3,803,471 | 4/1974 | Price et al. | 318/341 |
| 3,962,592 | 6/1976 | Thommen et al. | 307/297 |
| 3,991,323 | 11/1976 | Przybylski | 307/297 |
| 4,064,448 | 12/1977 | Eatock | 307/297 |

Primary Examiner—David Smith, Jr.
Attorney, Agent, or Firm—Cushman, Darby & Cushman

[57] ABSTRACT

Speed control apparatus for DC motor comprising a current mirror circuit including a first transistor 11 and second transistors 12-14 with their bases connected in common, the collectors of the second transistors 12-14 being in-common connected to one end of the DC motor 9 so as to control the motor current, the bases of the transistors being fed with such base current that saturates the transistors, thereby to raise their maximum controlling torque and starting torque of the DC motor.

4 Claims, 4 Drawing Figures

FIG. 4

SPEED CONTROL APPARATUS FOR DC MOTOR

BACKGROUND OF THE INVENTION

1. Technical Field

The present invention relates to an apparatus for speed control of a DC motor.

More particularly, the present invention concerns a apparatus for speed control of a DC motor capable of operating the DC motor with a larger values of maximum controlling torque and starting torque than the prior arts.

2. Background

Conventional speed control apparatus for a small DC motor, so-called electronics governor apparatus, generally is designed to operate in a manner that a counter-electromotive force which is in proportion to the speed, of the motor is taken out across both ends of motor winding and is compared with a reference voltage thereby to produce a difference of the two voltage, then the DC motor is controlled by utilizing the difference of the two voltage. In such conventional apparatus, the problem is that the speed control is made by the difference voltage, which is between the reference voltage and the voltage obtained across both ends of the motor winding. In general, the latter voltage obtained across the motor winding is not exactly the counter electromotive force per se, but a voltage also including a voltage drop mainly due to ohmic resistance of the motor winding. Therefore, it has been general to construct the circuit to include a resistor bridge circuit in order to provide an accurate speed controlling by taking out and utilizing the pure counter-electromotive force across both ends of the motor winding. In the speed control apparatus including such resistor bridge circuit, it is an important problem that the resistance values of the resistors should be accurate as designed. Recently, many electronics circuit has been semiconductorized or formed on an integrated circuit, and such speed control apparatuses are also made in the form of semiconductor integrated circuit. However, since making of the accurate resistance values of the bridge resistors by semiconductor diffused regions is generally difficult, these bridge resistors are usually provided as an external resistors which is connected to the integrated circuit. Such use of external resistors with the integrated circuit inevitably requires a number of external connection wires from the integrated circuit.

Figure 1:
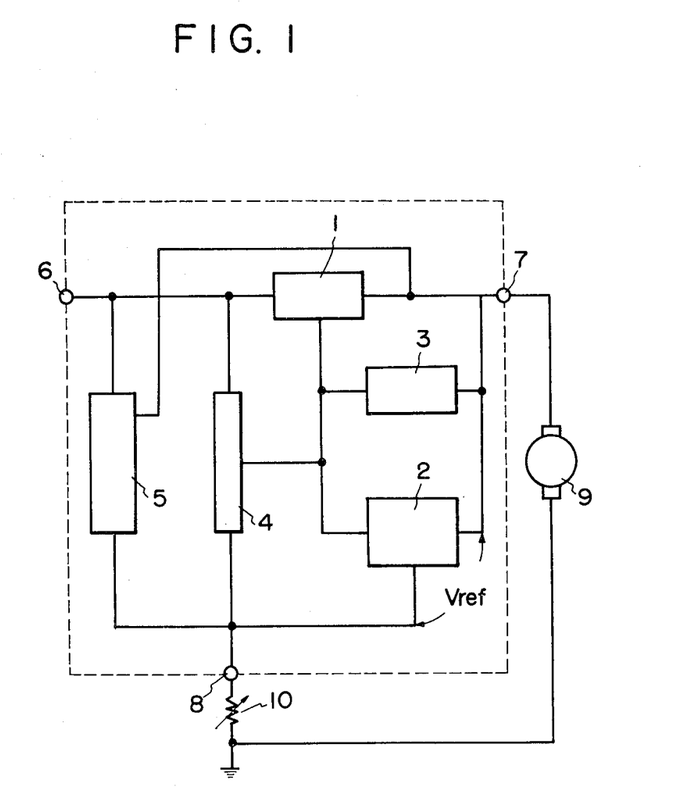
FIG. 1 is a block diagram schematically showing construction of the conventional speed control apparatus for a DC motor.

In order to remove the abovementioned inconvenience of a large number of wire connections, a conventional example of an integrated circuit type speed control apparatus shown in FIG. 1 has been already proposed and known.

In the known speed control apparatus of FIG. 1, the parts encircled by the dotted lines are formed on a monolithic integrated circuit, wherein 1 designates a controlling circuit, 2 a reference voltage generator, 3 a current limiting circuit, 4 a constant current circuit and 5 a current dviding circuit. A power source terminal 6, an output terminal 7 and an adjusting resistor terminal 8 for connecting an adjusting resisor 10 are provided as external connection terminals of the IC. Across the power source terminal 6 and the ground is connected a voltage source (not shown), across the output terminal 7 and the ground is connected a motor 9, and across the adjusting resistor terminal 8 and the ground is connected the adjusting resistor 10, by changing the resistance of which a desired speed of the motor is set.

In the abovementioned conventional speed control apparatus, the circuit operation is made in a manner that a reference voltage Vref which is proportional to the counter-electromotive force Ea of the DC motor is generated across the output terminal 7 and the adjusting resisjtor terminal 8, and a voltage drop in the adjusting resistor 10 is changed so as to be equal to the reference voltage Vref. For instance, when a voltage drop by an internal resistance of the DC motor 9 is changed by an external effect, the operation is made in a manner that by changing a current flowing through the adjusting resistor 10 by means of the current dividing circuit 5, the reference voltage Vref is hold to be equal to the counter-electromotive force Ea, so that the fluctuations of the revolving speed of the DC motor is suppressed.

When speed control of a DC motor is made by the above-mentioned speed control apparatus, there is such problems that it is difficult to obtain a large starting torque, and therefore, it takes a considerable time until the revolution speed of the motor reaches a predetermined value, and the the maximum controlling torque is small.

The present invention is made in view of the abovementioned problems of the conventional speed control appratus.

SUMMARY OF THE INVENTION

The present invention purports to provide an improved speed control apparatus for DC motor, the apparatus being capable of operating the DC motor with a larger values of maximum controlling torque and starting torque than the prior arts.

The speed control apparatus for DC motor in accordance with the present invention comprises a current circuit indicating a first transistor 11 and second transistors 12–14 with their bases connected in common, the collectors of the second transistors 12–14 being connected in series to the DC motor 9 so as to control the motor current, the bases of the transistors being fed with such base current that saturates the transistors, thereby raising their maximum controlling torque and starting torque of the DC motor.

DESCRIPTION OF THE PREFERRED EMBODIMENTS

Figure 2:
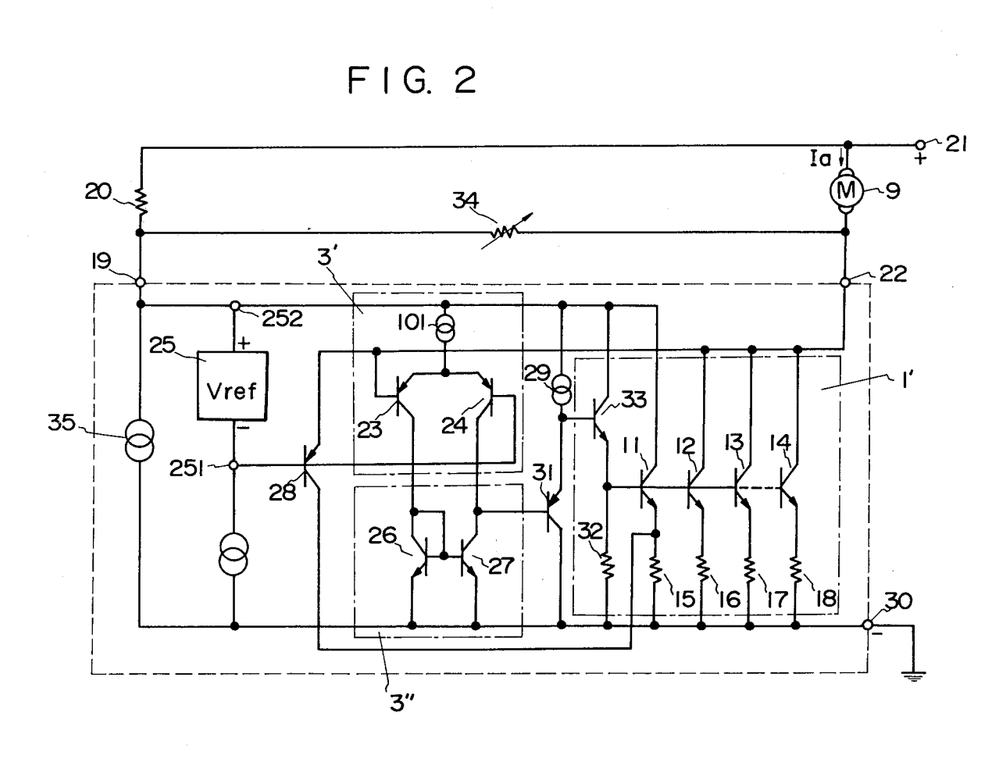
FIG. 2 is a circuit diagram of an example of speed control apparatus in accordance with the present invention.

A preferred embodiment of the present invention is now elucidated referring to FIG. 2, wherein a first transistor 11 and second transistors 12, 13, . . . 14 are of the same type (NPN type), have the same electric characteristics and connected in common at their bases. Emitters of these transistors 11, 12, 13, . . . 14 are connected through the emitter resistors of the same resistance, respectively, to the negative terminal 30 of the power source, namely the ground terminal. The transistors 11 to 14 of the common connected bases form a current mirror circuit, wherein the collector of the first transistor 11 is connected through a junction point 19 and a resistor 20 to a positive terminal 21 of the power source and the collectors of the second transistors 12 to 14 are connected in common to a junction point 22, between which and the positive terminal 21 the DC motor 9 is connected. In the circuit, the total of the collector currents of the second transistors 12 to 14 flows through the DC motor, and accordingly, by adjusting the base currents of the second transistors 12 to 14 the motor current Ia of the DC motor is adjusted and hence the revolution speed of the DC motor is controlled. The transistors 23 and 24 are PNP transistors and form a diferential amplifier 3', wherein the base of the transistor 23 is connected to the junction point 22 and the base of the transistor 24 is connected to a negative terminal 251 of a reference voltage source 25. The emitters of the transistors 23 and 24 are connected in common and through a constant current circuit 101 to the junction point 19. To the collectors of these transistors 23 and 24 are connected respective collectors of a pair of NPN transistors 26 and 27, which are connected so as to form a current mirror circuit 3", emitters of the transistors 26 and 27 being connected to the negative terminal 30 of the power source. A PNP transistor 28 is connected by its base to the negative terminal 251 of the reference voltage source 25, by its emitter to the junction point 22 and by its collector to the emitter of the first transistor 11. A junction point between the collectors of the transistors 24 and the 27 is connected to the base of a PNP transistor 31, which is connected by its emitter through a constant current circuit 29 to the junction point 19 and by its collector to the power source negative terminal 30. A transistor 33 is connected by its base to the emitter of the transistor 31, by its collector to the junction point 19 and by its emitter to the bases of the first transistor 11 and the second transistors 12–14, and also, through the resistor 32 to the negative terminal 30 of the power source. A variable resistor 34 as an adjusting resistor of the revolution speed is connected between the junction point 22 and a junction point 19, and a constant current circuit 35 is connected between the junction point 19 and negativae source terminal 30. The constant current circuit 35 is for suppressing change of current through the junction point 19 at a change of collector current of the transistor 33.

The automatic speed adjusting operation of the abovementioned FIG. 2 example of speed control apparatus of the present invention at occurrence of revolution speed fluctuation is as follows:

(1) Operation when motor speed becomes higher: When the motor speed fluctuates and becomes faster than a predetermined one, then the counter-electromotive force Ea of the DC motor 9 becomes higher than a predetermined one, and accordingly, the potential at the junction point 22 is lowered below a predetermined one. By such lowering of the potential at the junction point 22, the base bias voltage of the transistor 23, which is a part of the differential amplifier 3', becomes increased, thereby making it larger than that of the other transistor 24, and thereby increasing collector current of the transistor 23 and hence increasing collector current of the transistor 26. Accordingly, the collector current of the transistor 27, which is a part of the current mirror circuit 3", also increases, thereby increasing base current of the PNP transistor 31(,which base current flows from the base of the transistor 31 to the collector of the transistor 27), and hence increase emitter current of the transistor 31. Since the emitter current of the transistor 31 and the base current of the transistor 33 come from the common constant current circuit 29, at the time of increase of the emitter current of the transistor 31 the base current of the transistor 33 decreases, and thereby decreases base currents, hence collector currents, of the first transistor 11 and the second transistors 12 to 14. By such decrease of the collector currents of the second transistors 12 to 14, the motor current of the DC motor is decreased, and therefore, the revolution speed is lowered. Such control to lower the speed is made until the counter-electromotive force restores to the predetermined value, thereby making the base bias voltages of the transistors 23 and 24 of the differential amplifier 3' to be in an equbrium.

(2) Operation when motor speed becomes lower: When the motor speed fluctuates and becomes slower than the predetermined one, then the counter-electromotive force Ea of the DC motor 9 becomes lower than predetermined, and accordingly, the potential at the junction point 22 is raised than predetermined. By such rising of potential at the junction point 22, the base bias voltage of the transistor 23, which is a part of the differential amplifier 3', becomes decreased, thereby making it smaller than that of the other transistor 24, and thereby decreasing its collector current and hence decreases collector current of the transistor 26. Accordingly, the collector current of the transistor 27, which is a part of the current mirror circuit 3", decreases also, thereby decreasing base current of the PNP transistor 31, and hence decreases emitter current of the transistor 31. By means of the decrease of the emitter current of the transistor 31, the base current of the transistor 33 increases, and thereby increases base currents, hence collector currents of the first transistor 11 and the second transistors 12 to 14. By such increase of the collector currents of the second transistors 12 to 14, the motor current is increased and the revolution speed is raised. Such control to accelerate the speed is made until the counter-electromotive force restores to the predetermined value, thereby making the base bias voltages of the transistors 23 and 24 of the differential amplifier 3' to be in equibrium.

(3) Reason of large maximum controlling torque:

The feature of the apparatus of the present invention is that the maximum controlling torque of the DC motor controlled by the apparatus of the present invention is very large. The maximum controlling torque is the maximum value of the torque which retains revolution at a rating speed. The case when the maximum controlling torque becomes maximum is the case when the potential at the junction point 22 is minimum. Therefore, when the second transistors 12 to 14 are saturated, then the maximum controlling torque becomes large.

In the abovementioned apparatus of FIG. 2, to the junction point 19 is connected the collector of the transistor 33, which is for feeding through its emitter the base currents of the transistors 11 to 14. Furthermore, since the reference voltage generator 25 of the voltage Vref is connected across the junction point 19 and the base of the tranistor 28, emitter of which is connected to the junction point 22, the potential at the junction point 19 becomes higher than that of the junction point 22, by the reference voltage Vref (usually Vref is about 1.2 V).

Therefore, the collector potential of the transistor 33 is higher than that of the second transistors 12 to 14. Accordingly the transistor 33 can feed such enough currents to the bases of the second transistors 12 to 14 that can saturate the latter. Therefore, by such saturation of the transistors 12 to 14, a large motor current is fed as follows:

The maximum controlling torque $\Phi max$ for the abovementioned enough base current for saturation is given by the following formula (1):

$$\Phi max = Kt \cdot \frac{Vcc - Eao - Vce}{Ra + Reo} \qquad (1),$$

wherein
Kt . . . torque constant of the DC motor 9,
Vcc . . . source voltage impressed across the terminals 21 and 30,
Eao . . . counter-electromotive force at the rating revolution speed,
Vce . . . collector-emitter saturation voltage of the transistors 12 to 14,
Ra . . . internal resistance of the DC motor, and
Reo . . . equivalent resistance of the resistors 16 to 18 (that is, one n-th fraction of resistance of each of the resistors 16 to 18 for number n of the resistors 16 to 18).

For an example that, in the speed control apparatus of FIG. 2,
Kt=96 gcm/A,
Vcc=4.5 V,
Vce=0.5 V,
Eao=2.45 V,
Ra=6.3Ω, and
Reo=1Ω,
the maximum controlling torque $\Phi max$ is computed as follows:

$$\Phi max = 96 \times \frac{4.5 - 2.45 - 0.5}{6.3 + 1} = 20.4 \text{ gcm} \qquad (2)$$

This value of maximum controlling torque for such DC motor is as about twice large as that obtained by using the conventional speed controlling apparatus.

(4) Reason of large starting torque:

The other feature of the apparatus of the present invention is that the starting torquae of the DC motor controlled by the apparatus of the present invention is very large. The reason why such large starting torque is obtainable is elucidated as follows:

In the abovementioned example of FIG. 2, when the DC motor is locked, the counter-electromotive force of the DC motor becomes zero, and therefore the potential at the junction point 22 is considerably raised. As a result of the rising of the potential, the base bias of the transistor 23 is decreased, and therefore its collector current decreases, and hence the collector current of the transistor 26 decreases, and accordingly, the collector current of the transistor 27 decreases. And hence the base current of the transistor 31 is decreased. Since the total of the currents of the emitter of the transistor 31 and the base of the transistor 33 is controlled constant by the constant current circuit 29, the base current of the transistor 33 is increased by the decrease of the emitter current of the transistor 31. Therefore, the base currents of the first transistor 11 and the second transistors 12 to 14 increase, and resultantly lowers the potential at the junction point 22. Accordingly, a large motor current flows through the DC motor 9.

Provided that the ratio of the total value Ict of the collector currents of the second transistors 12 to 14 and collector current Ic11 of the first transistor 11 is K, namely K=(Ict/Ic11), then a current of about one K-th fraction of the motor current flows through the junction point 19 (and to the collector of the transistor 11) (Here, it is provided that the total of currents through the constant current circuits 29 and 101, the current through the collector of the transistor 33 and the current through the reference voltage generator 25 is negligidly small in comparison with the collector current of the first transistor 11.). Accordingly, by selecting the resistance value of the resistor 20 to be equal to K×Ra (Ra is the resistance of the DC motor), the potentials of the junction points 19 and 22 can be made equal, since, by so selecting, the voltage drops across the resistor 20 and across the DC motor 9 becomes equal with each other. In such case, the base potentials of the transistors 23 and 24 are not equal with each other. Namely, the potential of the base of the transistor 24 becomes lower than that of the transistor 23 by the value of the reference voltage Vref generated by the reference voltage generator 25. By such lowering of the base potential of the transistor 24, the base potential of the transistor 28 is also lowered, and resultantly increases base bias voltage of the transistor 28, hence increasing its collector current. Since the collector current of the transistor 28 flows into the emitter resistor 15 of the first transistor 11, the emitter potential of the first transistor 11 is raised. Accordingly, the condition for the current mirror circuit, which have been formed by the transistors 11 to 14 having the same emitter potential, is broken. Thus, the collector current of the first transistor 11 becomes smaller than each one of the second transistors 12 to 14. By such decrease of the collector current of the transistor 11, the voltage drop across the resistor 20 is lowered than that across the DC motor 9. This raises the potential at the junction point 19 to be higher than that of the junction point 22. According to the rising of the potential at the junction point 19, the collector voltage of the transistor 33 is increased, and therefore, the collector current of the transistor 33 is greatly increased. As a result of the increase of the collector current of the transistor 33, it becomes possible to feed such an enough base currents to the bases of the transistors 12 to 14 as to make the transistors 12 to 14 saturated. Accordingly, the collector currents of the second transistors 12 to 14, namely the motor current of the DC motor 9 greatly increases.

The starting torque $\Phi s$ of the DC motor 9 is given by the following formula (3):

$$\Phi s = Kt \cdot \frac{Vcc - Vce}{Ra + Reo} \qquad (3).$$

Provided the circuit constants are identical to those given in computing in the formula (2), the starting torque $\Phi s$ for such condition is:

$$\Phi s = 96 \times \frac{4.5 - 0.5}{6.3 + 1} = 52.6 \text{ gcm} \qquad (4).$$

This figure is as about twice large as the conventional starting torque.

Figure 3:
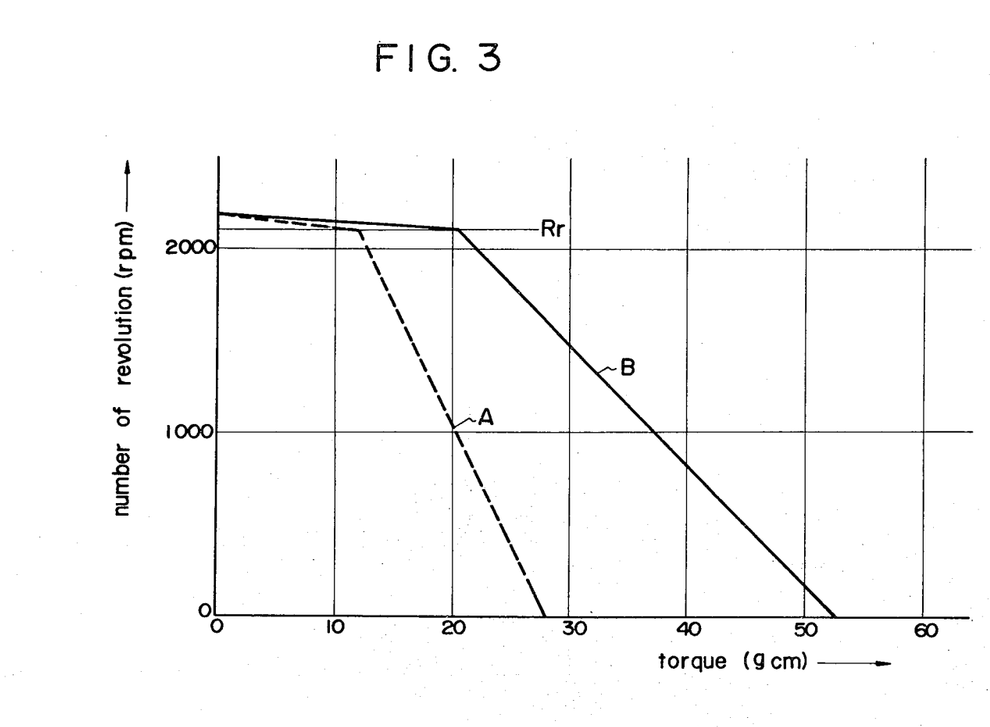
FIG. 3 is a graph comparingly showing relation between torques and numbers of revolution of DC motors operated by the speed control apparatus of the prior art and the present invention.

FIG. 3 shows changes of torque responding with revolution speed of DC motors. Curve A shows a change of the motor speed controlled by the speed control apparatus in accordance with the prior art, and Curve B shows a change of the motor speed controlled by the speed control apparatus in accordance with the present invention.

Abscissa indicates torque in gcm and ordinate indicates number of revolution (speed) in revolution per minute. As seen in FIG. 3, according to the present invention, the maximum controlling torque, over the value of which the number of revolution drops out from the rating number of revolution, is as almost twice high as that of the conventional apparatus. Moreover, the starting torque, namely the torque at the rising up of the curve, is also as almost twice high as that of the conventional one.

Figure 4:
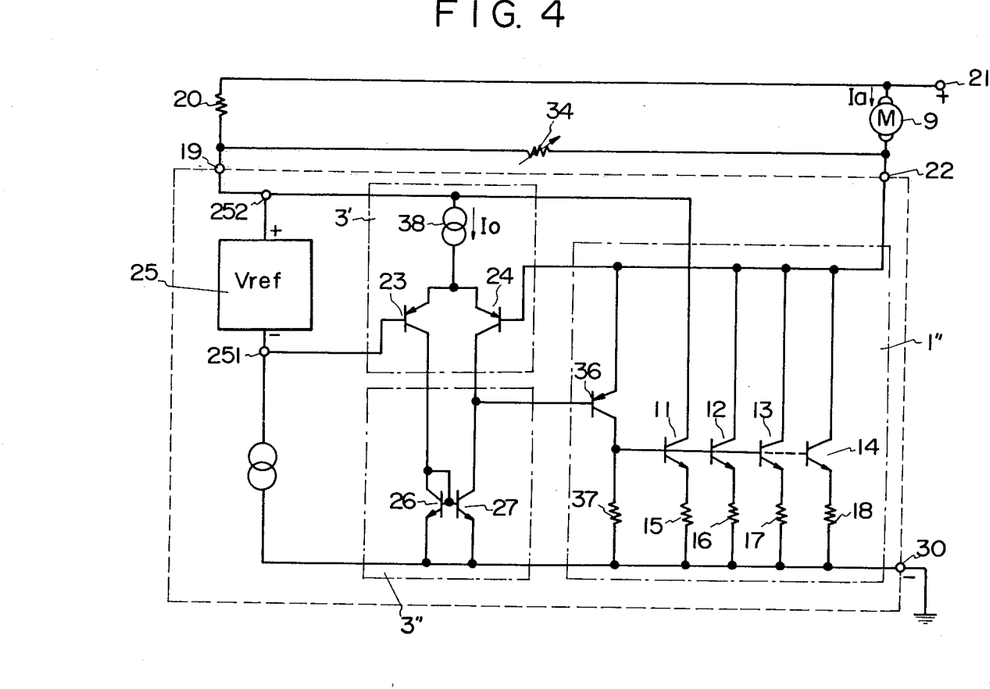
FIG. 4 is a circuit diagram of a modified example of the present invention.

FIG. 4 shows a modified example. In the circuit of FIG. 4, the circuit construction is more simple than in FIG. 2, but the operation is substantially the same with the example of FIG. 2. Principal difference is that a PNP transistor 36 is used instead of the NPN transistor 33 combined with the PNP transistor 31 and the constant current circuit 29. Also the transistor 28 of FIG. 2 is omitted. The bases of the transistors 23 and 24 in the differential amplifier circuit 3' are connected to the negativae terminal 251 of the reference voltage generator 25 and to the junction point 22, respectively. The transistor 36 is connected by the base to the collectors of the transistors 24 and 27 and by the emitter to the junction point 22.

The automatic speed adjusting operation of the abovementioned FIG. 4 example of speed control apparatus of the present invention at occurrence of revolution speed fluctuation is as follows:

(1') Operation when motor speed becomes higher: When the motor speed fluctuates and becomes faster than a predetermened one, then the counter-electromotive force becomes higher than a specified one, and accordingly, the potential at the junction point 22 is lowered below a specified one. By such lowering of the potential at the junction point 22, the base bias voltage of the transistor 24 of the differential amplifier 3' becomes increased, thereby making the base bias voltage larger than that of the other transistor 23. Therefore, the collector current of the transistor 24 increases and hence the collector current of the transistor 23 decreases, thereby decreasing the collector currents of the transistors 26 and 27. The decrease of the collector current of the transistor 27 makes the base current of the transistor 36 decrease, thereby decreasing its collector current and hence decreasing the base currents of the first transistor 11 and the second transistors 12 to 14. By such decrease of the base currents, the collector currents of the second transistors 12 to 14 decreases, and therefore the motor speed is lowered. Such control to lower the speed is made until the counterelectromotive force restores to the predetermined value, thereby making the base bias voltages of the transistors 23 and 24 of the differential amplifier 3' to be in an equibrium.

(2') Operation when motor speed becomes lower: When the motor speed fluctuates and becomes slower than a predetermined one, then the counter-electromotive force becomes lower than a specified one, and accordingly, the potential at the junction point 22 is raised over a specified one. By such raising of the potential at the junction point 22, the base bias voltage of the transistor 24 of the differential amplifier 3' becomes decreased, thereby making the base bias voltage smaller than that of the other transistor 23. Therefore, the collector current of the transistor 24 decreases and hence the collector current of the transistor 23 increases, thereby increasing the collector currents of the transistor 26 and 27. The increase of the collector current of the transistor 27 makes the base current of the transistor 36 increase, thereby increasing its collector current and hence increasing the base currents of the first transistor 11 and the second transistors 12 to 14. By such increase of the base currents, the collector currents of the second transistors 12 to 14 increases, and therefore the motor speed is accelerated.

(3) Reason of large starting torque:

In the example of FIG. 4, when the DC motor is locked, the counter-electromotive force of the DC motor becomes zero, and therefore the potential at the junction point 22 is considerably raised. As a result of the raising of the potential, the base bias of the transistor 24 is decreased, and therefore its collector current decreases. Accordingly, the collector current of the transistor 23 increases, and hence, the collector currents of the transistors 26 and 27 are increased. Therefore, the base current of the transistor 36, which flows into the collector of the transistor 27, increases. The current Io of the constant current circuit 38 is so adjusted that the current makes the transistor 36 saturated. When the base currents of the first transistor 11 and the second transistors 12 to 14 increase as a result of the saturation of the transistor 36, the collector currents of the transistors 11 to 14 also increase. Accordingly, the potential at the junction point 22 is lowered, thereby feeding the DC motor 9 with a large current.

Provided that the ratio of the total value Ict of the collector currents of the second transistors 12 to 14 and collector current Ic11 of the first transistor 11 is K, namely K=(Ict/Ic11), then a current of about one K-th fraction of the motor current flows through the junction point 19 (and to the collector of the transistor 11) (Here, it is provided that the total of the current through the constant current circuit 38 and the current through the reference voltage generator 25 is negligibly small in comparison with the collector current of the first transistor 11.). Accordingly, by selecting the resistance value of the resistor 20 to be equal to $K \times Ra$ (Ra is the resistance of the DC motor), the potentials of the junction points 19 and 22 can be made equal, since, by so selecting, the voltage drops across the resistor and across the DC motor 9 becomes equal with each other. In such case, the base potentials of the transistors 23 and 24 are not equal with each other. Namely, the potential of the base of the transistor 23 becomes lower than that of the transistor 24 by the value of the reference voltage Vref generated by the reference voltage generator 25. By such lowering of the base potential of the transistor 23, the differential amplifier 3' operated to make and hold the transistor 23 ON and the transistor 24 OFF.

Provided that, in the case of locking the motor,

VL . . . voltage across the junction point 22 and the terminal 30,

Vcc . . . voltage impressed across the power source terminals 21 and 30,

Reo . . . equivalent resistance of the resistors 16 to 18 (that is, one n-th fraction of resistance of each of the resistors 16 to 14 for number n of the resistors 16 to 18), Ra . . . internal resistance of the DC motor, Vben . . . base-emitter voltage of the second transistors 12 to 14 when all of them are made ON, Vces36 . . . collector-emitter voltage at the saturated state of the transistor 36, then, the voltage VL is given by the following formula:

$$VL = \frac{Vcc - VL}{Ra} \times Reo + Vben + Vces36$$
$$= \frac{Reo}{Ra} \times Vcc - \frac{Reo}{Ra} \times VL + Vben + Vces36. \quad (5)$$

By arranging the formula (5) with respect to VL, the following equation holds:

$$VL \times \left(\frac{Reo}{Ra} + 1\right) = \frac{Reo}{Ra} \times Vcc + Vben + Vces36. \quad (6)$$

By another arranging, the voltage (across the junction point 22 and the terminal 30) is given as follows:

$$VL = \frac{\frac{Reo}{Ra} \times Vcc + Vben + Vces36}{\frac{Reo}{Ra} + 1} \quad (7)$$

For an example that, in the speed control apparatus of FIG. 4, wherein
Ra=6.3Ω,
Reo=1.0Ω,
Vben=0.8 V,
Vces36=0.1 V,
Vcc=4.5 V,
the voltage VL across the points 22 and 30 is $$VL = \frac{\frac{1.0}{6.3} \times 4.5 + 0.8 + 0.1}{\frac{1.0}{6.3}} = 1.39 \, v \quad (8)$$

The lock current IL at the time of the locking is $$IL = \frac{Vcc - VL}{Ra} \quad (9)$$

By substituting the figures of Vcc=4.5 V, VL=1.39 V and Ra=6.3Ω in the formula (9) the lock current of such a large current as IL=0.494 A is obtainable.

Starting torque Φs of the DC motor is given as follows by multiplying the torque constant Kt=96 gcm/A and the lock current IL:

$$\Phi s = Kt \cdot IL = 96 \times IL \quad (10)$$

By substituting the figures of IL=0.494 A in the formula (10), the starting torque is given as:

Φs=96×0.494=47.4 gcm.

This starting torque of 47.4 gcm is much grater than average value of about 20 gcm obtained by using conventional apparatus.

When embodying the circuit of FIG. 4 in a semiconductor intergrated circuit, the PNP transistor 36 must be made in a known vertical type transistor, namely in a manner that collector, base and emitter are arranged in a vertical order with respect to the principal face of the semiconductor substrate, in order to give a satisfactory saturation of the second transistors 12 to 14, hence enough lock current to the DC motor. The reason why the vertical arrangement is necessary for such purpose is as follows: In order to give a large motor current, the base currents of the secondary transistors 12 to 14 becomes large, and therefore the collector current of the transistor 36 must be large. For one example, provided that the $h_{FE}$s of the second transistors 12 to 14 are 50 or higher, for the total motor current at the locked state of 0.494 A, the total of the base current of the transistors 12 to 14, given by IL/$h_{FE}$, must be about 9.9 mA. In order to allow such large base currents to the transistors 12 to 14, the collector or emitter current of the transistor 36 must be 9.9/$h_{FE36}$ mA, where $h_{FE36}$ is the current amplification factor of the transistor 36. If a known laternal type PNP transistor, which laternal type transistor is known as generally to have very low current amplification factor, is used for the transistor 36, a feeding of a large base current to the transistor 36 from the differential amplifier circuit is necessary, and this is a difficult problem. Instead, if the vertical type PNP transistor, which is known as generally to have sufficiently high current amplification factor, the value of the base current of the transistor 36 can be considerably small.

By employing the speed control apparatus of the present invention, for a DC motor of a record player, an advantage of very quick rise up of the revolution speed, since maximum controlling torque is very high with this apparatus.

Also, by employing the apparatus for a tape recorder, an advantage that even a considerable increase of the load by a large friction of the tape would not lock the motor, since the starting torque is considerably high with this apparatus.

What is claimed is:

1. A speed control apparatus for a DC motor comprising:

a first transistor having a collector connected through a first resistor to a first end of a power source and having an emitter connected through a second resistor to a second end of the power source, at least one second transistor of the same conductivity type as said first transistor having a base connected to the base of said first transistor, having a collector connected through said DC motor to said first end of the power source and having an emitter connected through a third resistor to said second end of the power source, a differential amplifier including a pair of transistors of the same conductivity type, said transistors having having emitters connected in common and joined through a constant current circuit to said collector of the first transistor, a first one of said pair of transistors having a base connected to the collector of said second and a second one of said pair of said transistors having a base connected through a reference voltage source to the collector of said first transistor, a current mirror circuit including an additional pair of transistors each having a collector, the collectors of said additional transistors being connected to respective collectors of the transistors of the differential amplifier at respective junction points, a third transistor having a control electrode connected to one of said junction points and an output electrode connected to the bases of said first and second transistors to control their base currents in response to changes of collector current of one of the transistors of said differential amplifier, and a speed adjusting variable resistor connected between the collector of said first transistor and the collector of said second transistor.

2. A speed control apparatus for a DC motor in accordance with claim 1, wherein
said second transistor comprises a plurality of parallel transistors each having the same characteristics and having their collectors connected in common and each being connected via a respective emitter resistor of the same resistance to the second end of the power source.

3. A speed control apparatus for a DC motor in accordance with claim 1, wherein
said first resistor and said speed adjusting variable resistor are formed as external resistors and the remainder of the circuit is formed as a monolithic semiconductor integrated circuit, said external resistors being connected to specified terminals of said monolithic semiconductor integrated circuit.

4. A speed control apparatus for a DC motor in accordance with claim 1, wherein
for a ratio K of the total value Ict of the collector current of the second transistor and the collector current Ic11 of the first transistor ($K = Ict/Ic11$), the resistance of said first resistor is selected as K-times that of the internal resistance of the DC motor.

* * * * *